United States Patent

Regnier

[11] Patent Number: 6,032,465
[45] Date of Patent: Mar. 7, 2000

[54] INTEGRAL TURBINE EXHAUST GAS RECIRCULATION CONTROL VALVE

[75] Inventor: Brian G. Regnier, Torrance, Calif.

[73] Assignee: AlliedSignal Inc., Morristown, N.J.

[21] Appl. No.: 09/212,110

[22] Filed: Dec. 15, 1998

Related U.S. Application Data

[60] Provisional application No. 60/068,163, Dec. 18, 1997.

[51] Int. Cl.[7] .......................... F02B 37/00; F02M 25/06
[52] U.S. Cl. .................................................. 60/605.2
[58] Field of Search ........................ 60/602, 605.2

[56] References Cited

U.S. PATENT DOCUMENTS

| | | | |
|---|---|---|---|
| 4,355,503 | 10/1982 | Grohn | 60/602 |
| 4,555,904 | 12/1985 | Melzer et al. | 60/605.2 |
| 5,406,796 | 4/1995 | Hiereth et al. | 60/605.2 |

FOREIGN PATENT DOCUMENTS

| | | |
|---|---|---|
| 531277 | 8/1992 | European Pat. Off. . |
| 3-160147 | 7/1991 | Japan ..................................... 60/605.2 |
| 2083135 | 3/1982 | United Kingdom . |

OTHER PUBLICATIONS

Patent Abstracts of Japan, No. 55123344, Sep. 22, 1980, Exhaust Gas Reflex Apparatus for Diesel Engine, Yasutaka.
Patent Abstracts of Japan, No. 06147027, May 27, 1994, Exhaust Recirculating Device, Takeshi.

*Primary Examiner*—Michael Koczo
*Attorney, Agent, or Firm*—Felix L. Fischer

[57] ABSTRACT

A turbocharger with an integral exhaust gas recirculation (EGR) chamber incorporated into the turbine housing attaches to an exhaust outlet casting having a segregated EGR chamber. A valve in the turbine housing EGR chamber allows recirculation of exhaust gas directly from the turbine volute.

3 Claims, 5 Drawing Sheets

INTEGRAL TURBINE EXHAUST GAS RECIRCULATION CONTROL VALVE

CROSS REFERENCE TO RELATED APPLICATIONS

This application claims the priority of application Ser. No. 60/068,163 filed on Dec. 18, 1997 having the same title as the present application.

FIELD OF THE INVENTION

This invention relates generally to the field of turbochargers and internal combustion engine exhaust gas recirculation (EGR) systems for emissions improvement and, more particularly, to a turbocharger comprising an EGR control valve incorporated as part of the turbocharger.

BACKGROUND OF THE INVENTION

Turbochargers for gasoline and diesel internal combustion engines are known devices used in the art for pressurizing or boosting the intake air stream, routed to a combustion chamber of the engine, by using the heat and volumetric flow of exhaust gas exiting the engine. Specifically, the exhaust gas exiting the engine is routed into a turbine housing of a turbocharger in a manner that causes an exhaust gas-driven turbine to spin within the housing. The exhaust gas-driven turbine is mounted onto one end of a shaft that is common to a radial air compressor mounted onto an opposite end of the shaft. Thus, rotary action of the turbine also causes the air compressor to spin within a compressor housing of the turbocharger that is separate from the exhaust housing. The spinning action of the air compressor causes intake air to enter the compressor housing and be pressurized or boosted a desired amount before it is mixed with fuel and combusted within the engine combustion chamber.

EGR is a known method for reducing NOX emissions in internal combustion engines. For effective use, an EGR system must overcome the adverse pressure gradient created by a positive pressure gradient across the engine, which is typical for example of modern high-efficiency diesel engines in at least a portion of their operating range. A conventional EGR system comprises a control valve that regulates the amount of exhaust gas that is taken from an engine exhaust manifold and returned to an engine induction system for mixing with the intake air and subsequent combustion. The EGR control valve is an ancillary device that is separate from both the engine and turbocharger. The conventional EGR system also includes a pump, separate from the turbocharger and engine, that increases the pressure of the returned exhaust gas routed by the EGR control valve to the induction system, to match the intake air charge or boost pressure exiting the turbocharger, thereby overcoming the positive pressure gradient across the engine.

Modern engine compartments, especially those of turbocharged internal combustion engines, are configured having minimal space for devices ancillary to the engine itself, thereby making use of such conventional EGR systems, comprising a separate control valve, pump, and exhaust and intake manifold bypasses, and related manifolding and plumbing difficult and sometimes impossible. It is, therefore, desirable that one or more device of an EGR system be constructed as an integral member of an existing component of a turbocharged internal combustion engine, to thereby enable use of an EGR system within the spatial confines of a modem engine compartment. It is also desirable that the component of a turbocharged internal combustion engine be adapted to incorporate at least one device of an EGR system therein both without sacrificing performance of the engine component itself, and in a manner that provides enhanced EGR system operation.

SUMMARY OF THE INVENTION

The present invention is a turbocharger for internal combustion engines having a turbine housing with an integral EGR chamber disposed therein that is separated from an exhaust gas outlet of the housing. The EGR chamber includes an exhaust gas passage that extends from the EGR chamber to a volute within the turbine housing. An EGR control valve is disposed within the EGR chamber and positioned over the exhaust gas passage to control the passage of exhaust gas from the volute and out of the turbine housing; and a flow path if provided from the EGR chamber to an EGR conduit.

DESCRIPTION OF THE DRAWINGS

The details and features of the present invention will be more clearly understood with respect to the detailed description and drawings in which.

DETAILED DESCRIPTION OF THE INVENTION

A turbocharger, constructed according to principles of this invention, comprises an exhaust valve disposed within an exhaust gas outlet casting of a turbocharger, typically identified as a turbine housing elbow casting, and an EGR control valve disposed within the turbocharger turbine housing. The exhaust valve is actuated to control the amount of exhaust back pressure in the turbine housing to provide a desired exhaust gas flow through the EGR control valve and out of the turbocharger turbine housing when the EGR control valve is actuated.

Figure 1:
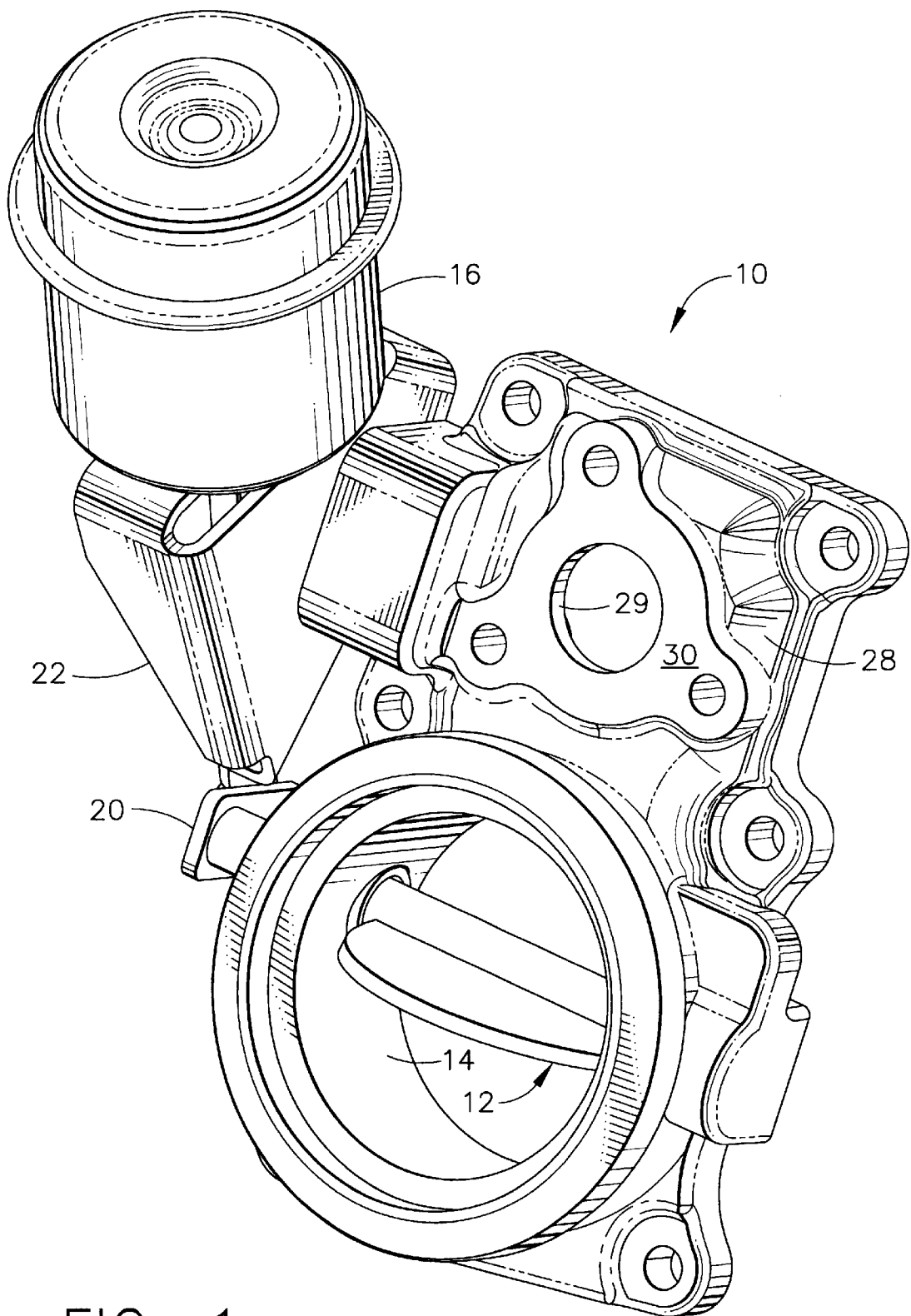
FIG. 1 is a perspective first side view of a turbocharger turbine housing elbow casting constructed according to principles of this invention.
Figure 2:
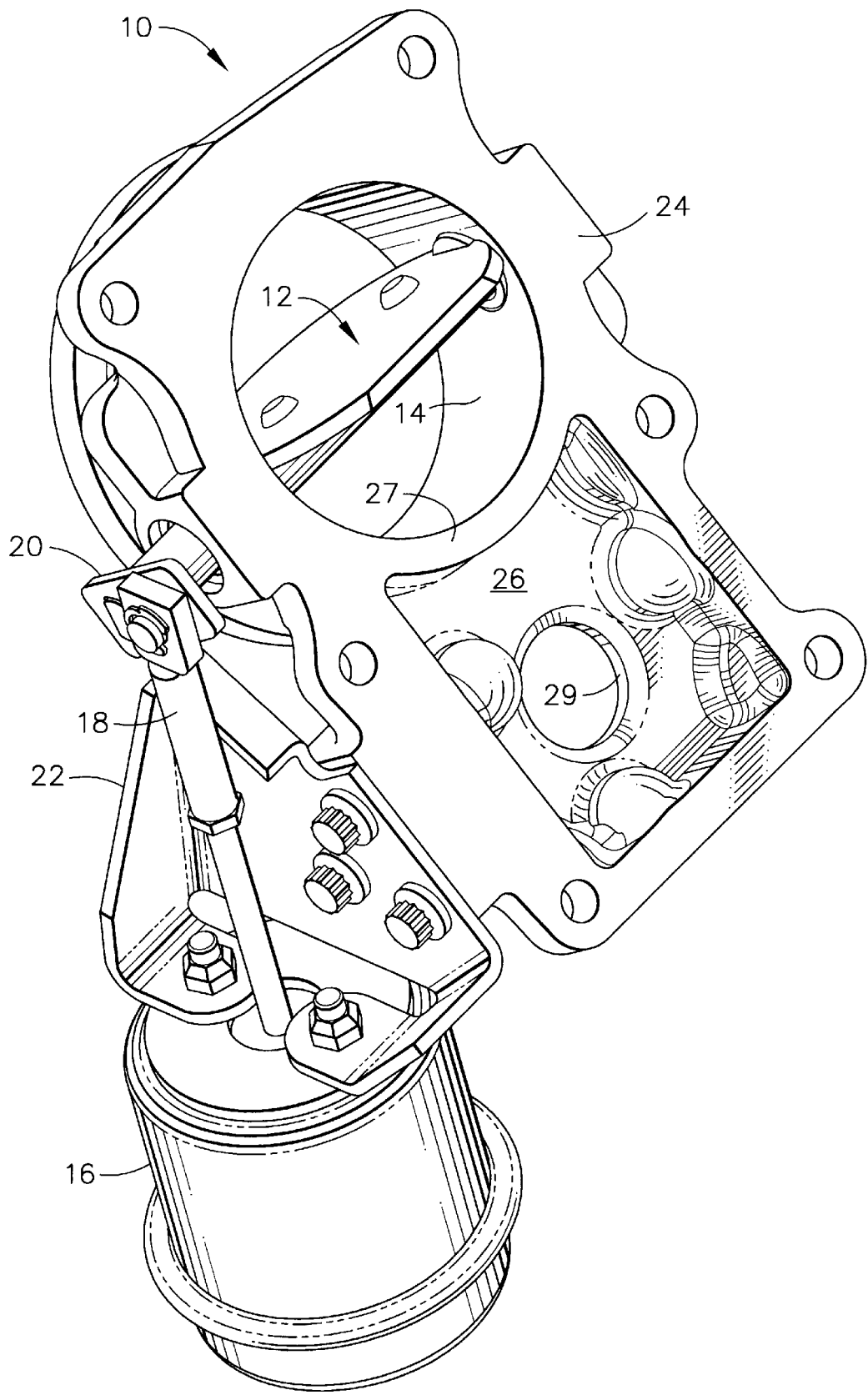
FIG. 2 is a perspective second side view of the turbine housing elbow casting of FIG. 1.

Referring to FIGS. 1 and 2, a turbocharger turbine elbow casting 10 incorporates an exhaust valve 12 that is rotatably disposed within an exhaust gas outlet 14 extending through the elbow casting. The exhaust valve 12 can be of conventional design, and is preferably in the form of a butterfly valve having a diaphragm diameter that is similar to that of the outlet 14, and that is disposed diametrically therein. The exhaust valve 12 is actuated within the outlet to restrict the flow of exhaust gas passing therethrough by conventional actuating means 16, such as by a pneumatic, electric or vacuum actuator. In a preferred embodiment, the actuating means 16 is in the form of a vacuum actuator that is connected to the exhaust valve by an actuating piston 18 attached at one end to stem 20 extending radially from the exhaust valve 12. The actuating means 16 is attached to the turbine elbow casting by a suitable mounting plate 22.

The turbine elbow casting 10 is adapted, along a mating surface 24, to be attached to a complementary surface of a turbocharger turbine housing. The turbine elbow casting includes an EGR chamber 26 that is incorporated therein, and that is separated from the exhaust gas outlet 14 by wall 27. The EGR chamber 26 is configured having a size and depth sufficient to accommodate movement of an EGR control valve therein. The turbine elbow casting includes an outer-facing or backside surface 28 that is adapted to facilitate attachment of an EGR conduit or other device (not shown) to the EGR chamber 26, and incorporates an EGR passage 29 extending therethrough from the EGR chamber. As illustrated in FIG. 1, in a preferred embodiment, the EGR device is attached to a mating flange 30, positioned on the backside surface 28 of the EGR chamber concentrically around the EGR passage 29, by conventional bolt attachment.

Figure 3:
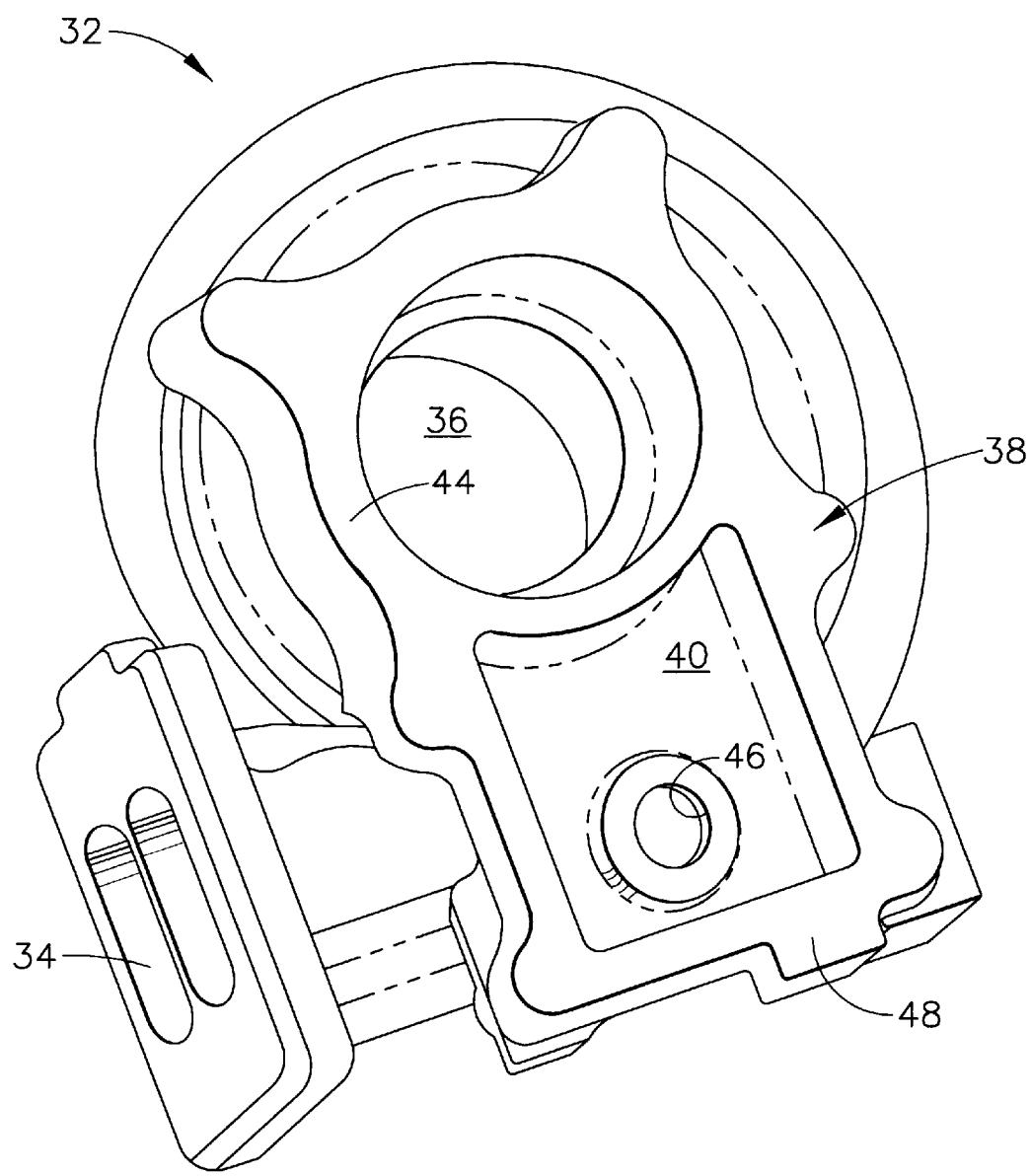
FIG. 3 is a perspective side view of a turbocharger turbine housing constructed according to principles of this invention.

FIG. 3 illustrates a turbocharger turbine housing 32 constructed according to principles of this invention. The turbine housing 32 includes an exhaust gas inlet 34 extending radially through the housing that is flanged to accommodate attachment to an internal combustion engine exhaust manifold. The turbine housing 32 includes am housing exhaust gas outlet 36 that extends axially therethrough. Although not illustrated, the turbine housing is adapted to contain a turbocharger exhaust gas-driven turbine therein. The turbine includes radially extending blades that are disposed within a turbine housing volute (see FIG. 5) and that are contacted with exhaust gas entering the turbine housing exhaust gas inlet 34. The turbine housing is illustrated without a turbine disposed therein for purposes of clarity and reference. However, it is to be understood that the turbocharger turbine housing of this invention is intended to be used with parts conventional to turbochargers.

Figure 4:
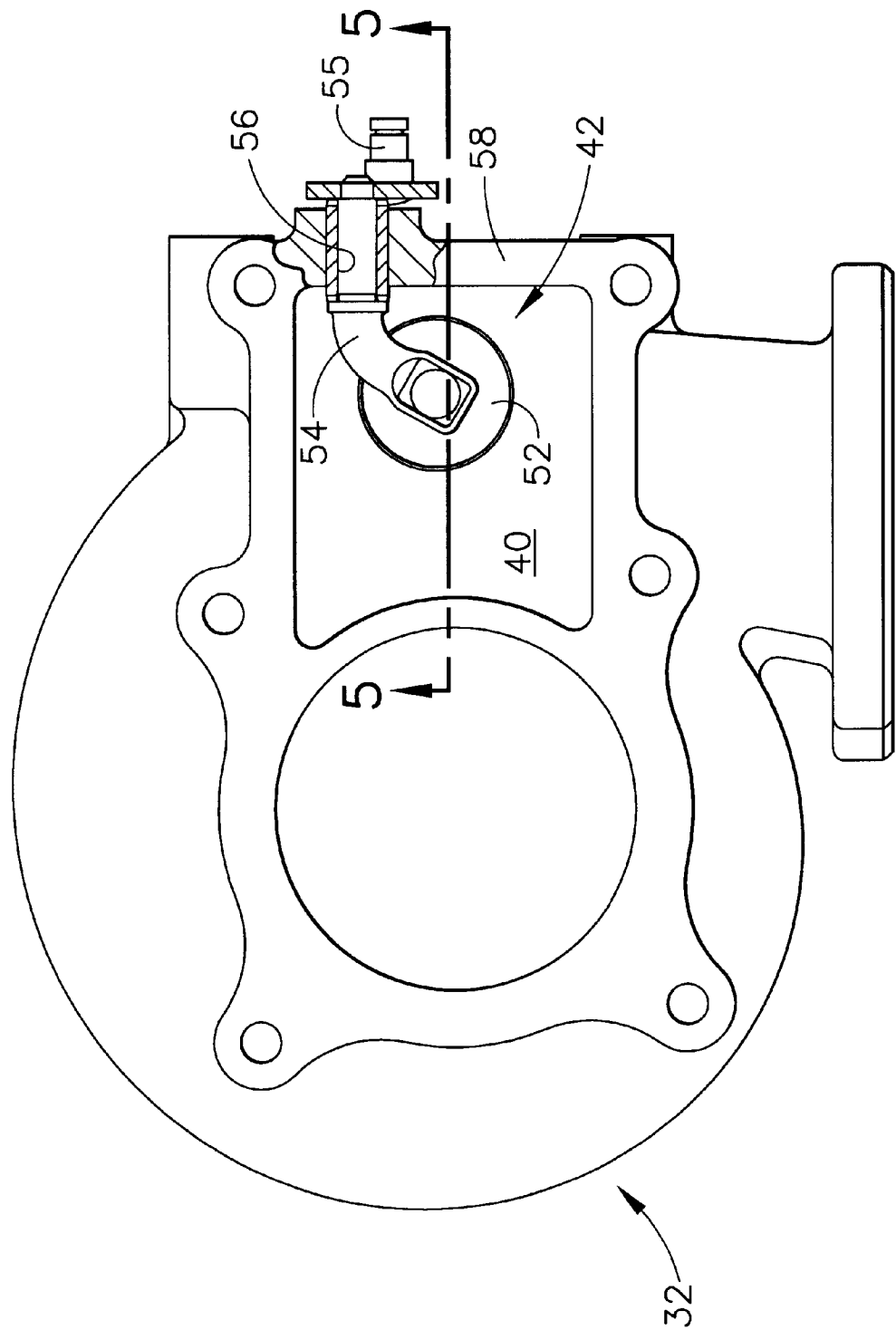
FIG. 4 is a side elevational view of the turbocharger turbine housing of FIG. 3.
Figure 5:
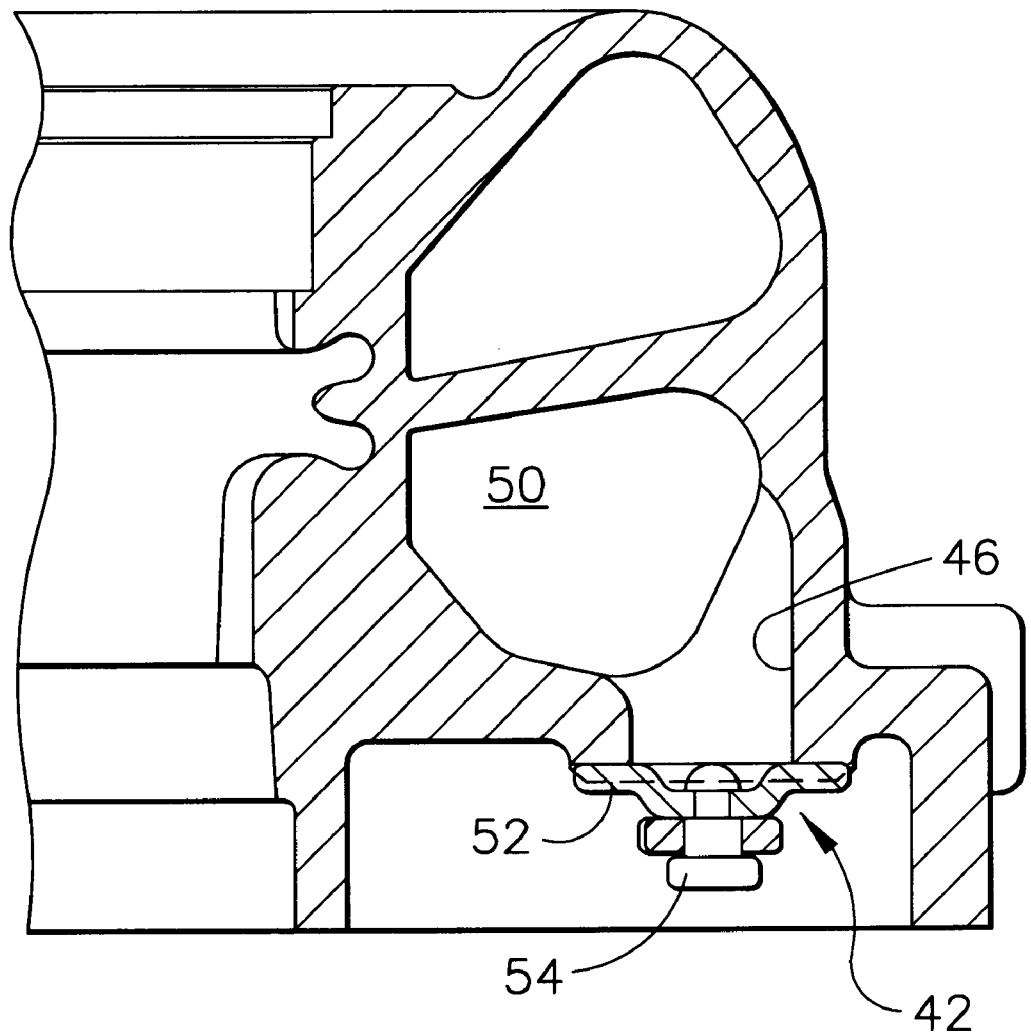
FIG. 5 is a cross sectional view of section 5—5 of the turbocharger turbine housing of FIG. 4.

The turbine housing 32 includes a mating surface 38 that is adapted to mate with the complementary mating surface 24 of the turbine elbow casting 10, and that includes an EGR chamber 40 disposed therein. The EGR chamber 40 is configured having sufficient size and depth to incorporate an EGR control valve 42 (as shown in FIGS. 4 and 5) therein. The EGR chamber 40 is separated from the turbine housing central opening 36 by wall 44. The EGR chamber 40 includes an exhaust gas passage 46 that extends through a wall surface 48 of the EGR chamber interconnecting to a turbine housing volute 50 (as shown in FIG. 5).

Referring to FIG. 4, the EGR control valve 42 is disposed within the EGR chamber 32 to seat against the exhaust gas passage to prevent passage of exhaust gas therefrom when in a non-actuated state. The EGR control valve can be of conventional type, and in a preferred embodiment is in the form of a flapper valve comprising a poppet or diaphragm 52 positioned over the exhaust gas passage to prevent the passage of exhaust gas therefrom. An actuator arm 54 is attached at one of its ends to the diaphragm 52 and passes through an opening 56 in a wall section 58 of the EGR chamber 40. The actuator arm 54 is configured at an end 55 opposite the diaphragm 52 to accommodate attachment with a suitable actuating means (not shown), such as those described above useful for actuating the exhaust valve. In a preferred embodiment, the actuator arm 54 is configured to permit actuation of the EGR control valve diaphragm 52, to open and close the exhaust gas passage, by rotational movement of the actuating arm within the opening 56 caused by actuating end 55.

Referring to FIG. 5, placement or seating of the EGR valve diaphragm 52 over the exhaust gas passage 46 prevents exhaust gas within the turbine housing volute 50 from exiting therefrom during operation of the turbocharger. The EGR valve 42 is actuated, e.g., in response to a control signal sent from an EGR controller or the like to an EGR control valve actuating means. The EGR control valve 42 is actuated after the exhaust valve 12 has been actuated to restrict the flow path of exhaust gas exiting from the housing exhaust gas outlet 36 through the turbine housing 32 via the elbow casting exhaust gas outlet 14. After a desired back pressure is achieved within the turbine housing 32 and turbine volute 50, the EGR control valve 42 is actuated so that the diaphragm 52 is moved away from the exhaust gas passage 46, thereby permitting exhaust gas to be routed from the turbine volute 50, through the turbine housing EGR chamber 40, through the turbine elbow casting EGR chamber 26, and to an EGR device or EGR system plumbing attached to the turbine elbow casting backside surface 28. The exhaust gas removed from the turbocharger is then suitably treated, e.g., pressurized and adjusted for correct fuel to air ratio, for introduction into the intake air stream of the internal combustion engine.

In the embodiment shown in the drawings, the EGR chamber 40 in the turbine housing and the EGR chamber 26 in the elbow casting are mutually sized to accommodate actuation of the EGR valve which is mounted in the turbine housing. In alternative embodiments, the EGR valve is mounted in the elbow casting with appropriate adjusting in size of the EGR chamber 26.

The turbocharger turbine housing and turbine elbow casting, constructed according to principles of this invention, are attached together according to conventional practice and are combined with other parts conventionally associated with turbochargers to provide a turbocharger for internal combustion engines that incorporates both an exhaust valve and an EGR control valve therein. A feature of this invention is that the EGR control valve is incorporated into the construction of the turbocharger itself, rather than being an individual device of an EGR system ancillary to engine and turbocharger, thereby avoiding the need for additional space within an engine compartment and maximizing the limited space available within modern engine compartments. Additionally, the turbocharger turbine housing and turbine elbow casting, constructed according to principles of this invention, incorporates the EGR control valve therein in a manner that does not adversely impact turbocharger or EGR control valve performance.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A turbocharger for internal combustion engines comprising:
   a turbine housing having an integral EGR chamber disposed therein that is separated from an exhaust gas outlet of the housing, wherein the EGR chamber includes an exhaust gas passage that extends from the EGR chamber to a volute within the turbine housing;
   an EGR control valve disposed within the EGR chamber and positioned over the exhaust gas passage to control the passage of exhaust gas from the volute and out of the turbine housing; and,
   a flow path from the EGR chamber to an EGR conduit.

2. The turbocharger as defined in claim 1 wherein the flow path comprises:
   a turbine elbow casting attached to the turbine housing having:

an exhaust gas outlet that extends therethrough and that is positioned separate from the turbine housing exhaust gas outlet.

3. The turbocharger as defined in claim 2 further comprising:

an exhaust valve disposed within the turbine elbow casting exhaust gas outlet; and an EGR chamber disposed within the turbine elbow casting and opposite to the turbine housing EGR chamber, wherein the turbine elbow casting EGR chamber is separate from the turbine elbow casting exhaust gas outlet.

* * * * *